Aug. 25, 1953   H. P. PHILLIPS   2,650,144
PISTON RING
Filed Feb. 29, 1952
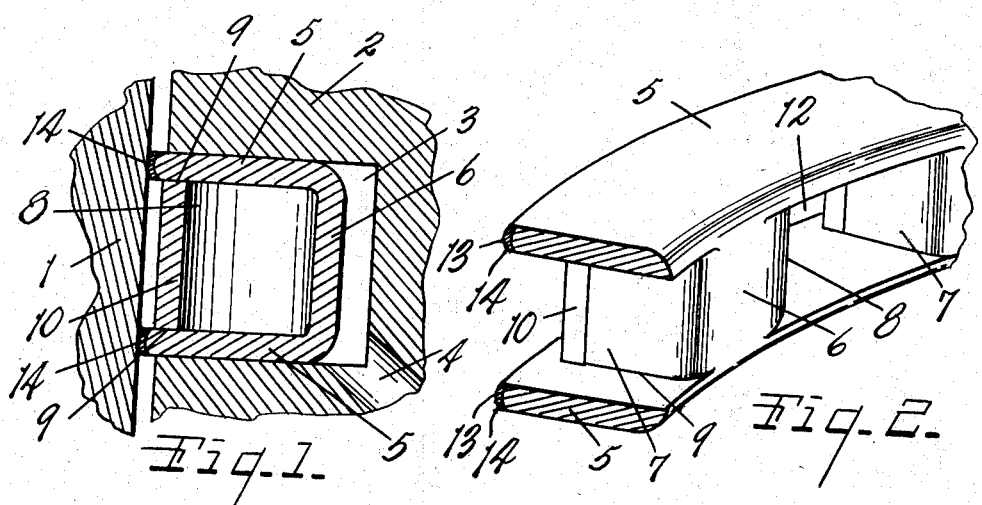
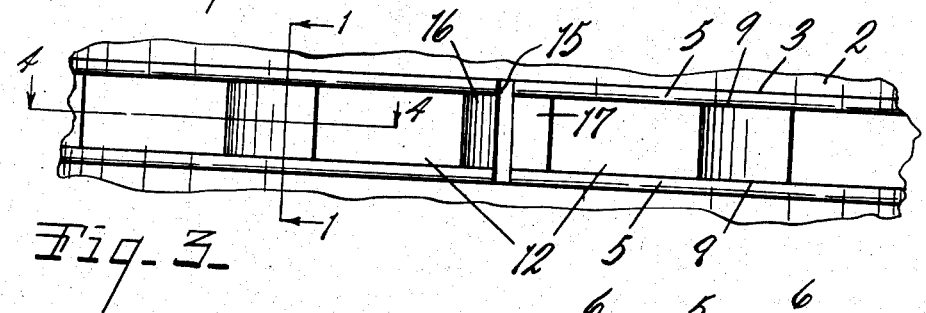
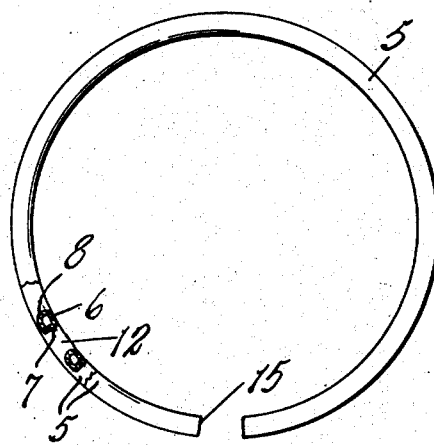
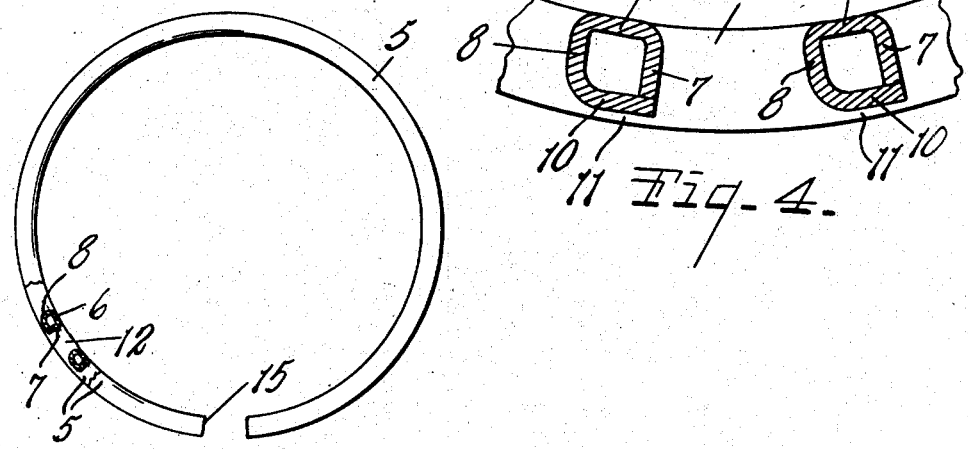
INVENTOR.
Harold P. Phillips
BY
Otto A. Earl
Attorney Patented Aug. 25, 1953

2,650,144

UNITED STATES PATENT OFFICE 2,650,144

PISTON RING

Harold P. Phillips, Hastings, Mich., assignor to Hastings Manufacturing Company, Hastings, Mich.

Application February 29, 1952, Serial No. 274,109

9 Claims. (Cl. 309—29)

This invention relates to improvements in piston rings.

The main objects of this invention are:

First, to provide an annular split springably resilient piston ring comprising axially spaced cylinder wall engaging members and one which is formed integrally of ductile metal and is light in weight and at the same time is strong and durable and capable of withstanding severe installing distortions and stresses without injury.

Second, to provide a piston ring formed integrally of ductile metal and comprising axially spaced radially flat cylinder wall engaging members which are effectively supported against twisting and torsional stress and against axial thrust to which they are subjected in use.

Third, to provide a piston ring having these advantages which may be very economically produced both in the matter of stock and in the fabricating of same.

Objects relating to details and economies of the invention will appear from the description to follow. The invention is defined and pointed out in the claims.

A preferred embodiment of the invention is illustrated in the accompanying drawing, in which Fig. 1 is an enlarged fragmentary vertical section of a piston ring embodying my invention installed in a piston ring groove of a piston and in operative relation to a cylinder wall on a line corresponding to line 1—1 of Fig. 3. No attempt is made to show the cylinder, piston and the ring in their relative proportions or to show the clearance or tolerances between the several parts, the view being illustrative.

Fig. 2 is an enlarged fragmentary perspective view from the inside of the ring.

Fig. 3 is a fragmentary elevational view of the ring as installed in a piston ring groove as in Fig. 1.

Fig. 4 is a fragmentary view on a line corresponding to line 4—4 in Fig 3.

Fig. 5 is a side elevational view of the ring with a portion broken away.

In the accompanying drawing 1 represents an internal engine combustion cylinder, 2 a piston having a piston ring groove 3 therein, provided with drain openings 4. The piston ring of my invention comprises axially spaced cylinder wall engaging members 5—5 which are connected at their inner edges by angularly spaced tie elements 6. The edge portions 7 and 8 of the tie elements are turned or bent outwardly to provide supporting strut elements for the cylinder wall engaging members 5. The end edges of the strut elements are in axial thrust supporting engagement with the inner sides of the cylinder wall engaging members. The outturned tongue-like portions 8 are substantially longer than the portions 7 and are folded over at 10 into overlapping supporting engagement with the end edges of portions 7 as shown in the drawing. This results in struts of generally tubular section. The outer sides of the struts are disposed adjacent but in inwardly spaced relation to the cylinder wall engaging edges 11 of the cylinder wall engaging members.

The piston ring of the embodiment of my invention illustrated is formed of ductile ribbon steel conformed to outwardly facing channel section and coiled providing spaced flanges and a connecting web for their inner edges. The flanges of the channel constitute the cylinder wall engaging members 5. The tongue-like portions 7 and 8 are struck outwardly from the web and desirably conformed to coact in providing generally tubular struts disposed between the cylinder wall engaging members with their end edges in thrust supporting engagement therewith.

The ring of my invention is particularly desirable as an oil ring, the spaces 12 between the tie members 6 constituting drainage openings. The side members are radially flat and are supported against torsional twist and the ring is well adapted to receive the distorting springing stresses to which it is subjected in installing without breakage or injury thereto. While the ring is very light in weight, it is highly efficient. The fabricated ring is tempered after forming and its parts are so arranged that no serious distortion results from the tempering.

In the embodiment illustrated the cylinder wall engaging edges 13 of the cylinder wall engaging members are rounded and chrome plated at 14. The rounded chrome plated edges provide a substantial line contact with the cylinder wall securing an effective sealing engagement with the wall, and also a highly desirable wear resisting surface.

The ends 15 of the ring at the split thereof are connected by sections 16 and 17 of one of the struts. This prevents springing and distortion of the cylinder wall contacting members at the ends thereof.

While the gage of the stock may be varied as found desirable for particular sizes and conditions, stock of approximately 20 to 30 gage is satisfactory for a wide range of sizes and uses.

I have not attempted to illustrate or describe other adaptations or modifications which might be made in the form of particular struts as it is believed that this disclosure will enable those skilled in the art to embody or adapt my invention as may be desired.

Having thus described my invention, what I claim as new and desire to secure by Letters Patent is:

1. An annular split resilient piston ring of outwardly facing channel section formed of ribbon steel, the flanges constituting cylinder wall engaging members, and angularly spaced strut elements of generally tubular section integral with the web and projecting radially outward therefrom between and with their ends in axial supporting engagement with the inner sides of the cylinder wall engaging members, the outer sides of the said strut elements being adjacent but inwardly spaced from the peripheries of the wall engaging members, the spaces between the struts constituting drain openings, the ends of the cylinder wall engaging members at the split thereof being connected by sections of a strut.

2. An annular split resilient piston ring of outwardly facing channel section formed of ribbon steel, the flanges being continuous and constituting cylinder wall engaging members having continuous peripheral cylindrical wall engaging edges, and angularly spaced strut elements integral with the web and projecting radially outward therefrom between and with their ends in axial supporting engagement with the inner sides of the cylinder wall engaging members, the outer sides of the said strut elements being adjacent but inwardly spaced from the peripheries of the wall engaging members, the spaces between the struts constituting drain openings.

3. An annular split resilient piston ring of outwardly facing channel section formed of a strip of steel, the flanges constituting cylinder wall engaging members, and angularly spaced strut elements of generally tubular section integral with the web and projecting radially outwardly therefrom between and with their ends in axial supporting engagement with the inner sides of the cylinder wall engaging members, the outer sides of the said strut elements being adjacent but inwardly spaced from the peripheries of the wall engaging members, the ends of the cylinder wall engaging members at the split thereof being connected by sections of a strut.

4. An annular split resilient piston ring of outwardly facing channel section formed of a strip of steel, the flanges being continuous and constituting cylinder wall engaging members having continuous peripheral cylindrical wall engaging edges, and angularly spaced strut elements integral with the web and projecting radially outwardly therefrom between and with their ends in axial supporting engagement with the inner sides of the cylinder wall engaging members, the outer sides of the said strut elements being adjacent but inwardly spaced from the peripheries of the wall engaging members.

5. An annular split resilient piston ring of outwardly facing channel section formed of a strip of steel, the flanges constituting cylinder wall engaging members, and angularly spaced strut elements of generally tubular section integral with the web and projecting radially outwardly therefrom between and with their ends in axial supporting engagement with the inner sides of the cylinder wall engaging members, the ends of the cylinder wall engaging members at the split thereof being connected by sections of a strut.

6. An annular split resilient piston ring of outwardly facing channel section formed integrally of a strip of steel, the flanges of the channel constituting cylinder wall engaging members, and angularly spaced strut elements integral with the web of the channel and projecting radially outwardly therefrom between and with their ends wardly therefrom between and with their ends in axial supporting engagement with the inner sides of the cylinder wall engaging members, the ends of the cylinder wall engaging members at the split thereof being connected by sections of a strut.

7. An annular split resiliently springable piston ring formed integrally of a strip of ductile metal and comprising axially spaced cylinder wall engaging members connected at their inner edges by angularly spaced tie members integral therewith, opposed edge portions of the tie members being disposed outwardly between cylinder wall engaging members and conformed to provide generally tubular axial thrust sustaining struts for cylinder wall engaging members.

8. An annular split resiliently springable piston ring formed integrally of a strip of ductile metal and comprising flat axially spaced continuous cylinder wall engaging members having continuous peripheral cylindrical wall engaging edges and connected at their inner edges by angularly spaced tie members integral therewith, integral portions of the tie members being disposed outwardly between the cylinder wall engaging members and constituting struts in axial thrust supporting relation thereto, the outer sides of the struts being adjacent to but inwardly spaced from the peripheries of the wall engaging members, the wall engaging members having rounded chrome plated peripheral cylinder wall engaging edges providing substantially line contact with the cylinder wall in which the ring is installed.

9. An annular split resiliently springable piston ring formed integrally of a strip of ductile metal and comprising flat axially spaced continuous cylinder wall engaging members having continuous peripheral cylindrical wall engaging edges and connected at their inner edges by angularly spaced tie members integral therewith, integral portions of the tie members being disposed outwardly between the cylinder wall engaging members and constituting struts in axial thrust supporting relation thereto, the wall engaging members having rounded chrome plated peripheral cylinder wall engaging edges providing substantially line contact with the cylinder wall in which the ring is installed.

HAROLD P. PHILLIPS.

References Cited in the file of this patent

UNITED STATES PATENTS

| Number | Name | Date |
|---|---|---|
| 2,357,467 | Guelker | Sept. 5, 1944 |
| 2,383,825 | Smith | Aug. 28, 1945 |
| 2,432,602 | Zahodiakin | Dec. 16, 1947 |
| 2,439,546 | McFall | Apr. 13, 1948 |
| 2,580,124 | Phillips | Dec. 25, 1951 |
| 2,594,987 | Phillips | Apr. 29, 1952 |